T. MIDGLEY, Sr.
TIRE.
APPLICATION FILED OCT. 29, 1914.
1,159,244.
Patented Nov. 2, 1915.
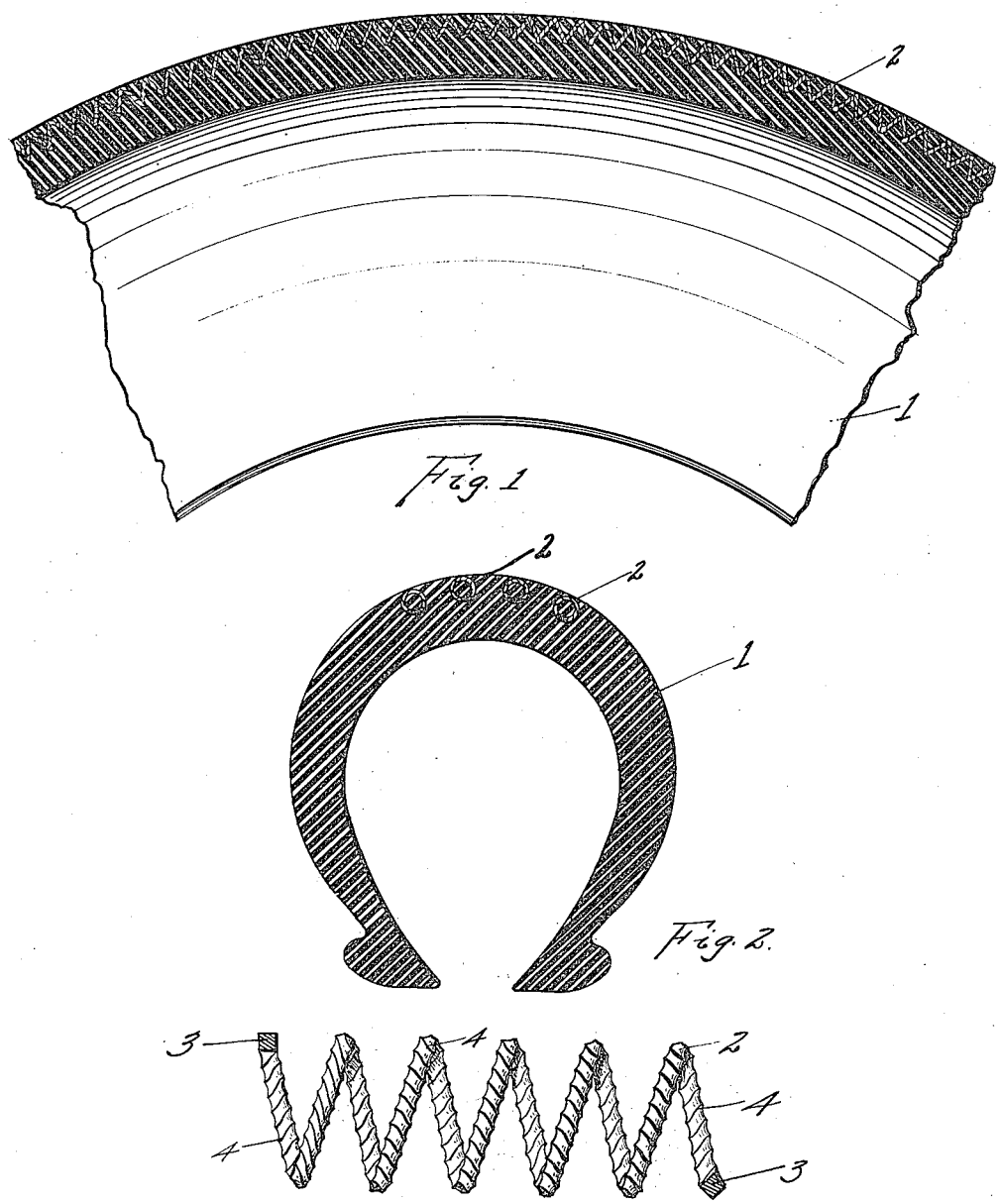

UNITED STATES PATENT OFFICE.

THOMAS MIDGLEY, SR., OF LANCASTER, OHIO, ASSIGNOR TO THE MIDGLEY TIRE & RUBBER COMPANY, OF LANCASTER, OHIO, A CORPORATION OF WEST VIRGINIA.

TIRE.

1,159,244.      Specification of Letters Patent.      Patented Nov. 2, 1915.

Application filed October 29, 1914. Serial No. 869,328.

*To all whom it may concern:*

Be it known that I, THOMAS MIDGLEY, Sr., a citizen of the United States, residing at Lancaster, in the county of Fairfield and State of Ohio, have invented certain new and useful Improvements in Tires, of which the following is a specification.

My invention relates to the improvement of vehicle tires and contemplates particularly the provision of a non-skid tread portion for rubber or other composition tires used particularly upon motor vehicles.

In this connection, my invention consists in the use of a peculiarly constructed supplemental resistance element to be embedded in the tread of the tire itself in such manner that it will present itself in a manner to have a gripping engagement with the road bed as the vehicle moves along.

Therefore, the main object of my invention resides in the provision of a tire structure wherein there is embedded in the tread a plurality of whorls, these whorls being themselves formed of a wire whose form or shape presents a structure which will itself prevent turning of these whorls about their axes as a center when they are thus embedded.

Another object of my invention resides in the provision of a plurality of wire whorls, these whorls being of such shape in cross section that when the wire unit from which they are made is previously axially twisted they will present a conformation preventing their turning about their axes as a center when they are embedded in a tire tread. It is known that these metallic or other whorls do not readily bind or vulcanize themselves to the body of the tire itself and consequently, after the tread portion has become slightly worn, these whorls may be readily removed by their turning about their own axes, particularly upon their catching in the road. This latter is true where these whorls themselves have not been so shaped to guard against this accidental removal prior to their placement in the tire.

A further object of my invention resides in the specific shape of structure shown, namely, a connected succession of circular whorls forming a helical coil, the wire from which this coil is formed being of the shape referred to and being twisted prior to its being formed into a completed coil.

The preferred embodiment of my invention is shown in the accompanying sheet of drawings, in which similar characters of reference designate corresponding parts, and in which:

Figure 1 is a central vertical section through a tire casing showing my improved non-skid arrangement. Fig. 2 is a transverse section of the structure shown in Fig. 1, and, Fig. 3 is an enlarged detail view showing a portion of the coil used before its placement in the tire or tread.

My invention is applicable to all types of tires wherein a rubber or similar composition is used, whereby a resilient effect may be had.

In the drawings, I have shown my invention applied to a rubber casing for forming a portion of pneumatic tires, this casing being shown at 1 and having a plurality of coils of wire 2 circumferentially embedded therein. These coils may be placed flush with the road engaging portion, or they may be placed either slightly below this surface or slightly above this surface as may be desired. Where they are placed slightly under the road engaging surface, the wear after a short time will cause their appearance on the outer surface of the tread itself, or if they are so placed to project slightly beyond the road engaging surface, the exposed portions may be removed in any desired manner. In all events, after a certain amount of wear, the outside portions of each of the whorls forming these coils, will be worn away leaving a plurality of detached whorls in the tire itself as opposed to continuous coils, as shown. In order that these whorls may not work themselves out by the action of the tire when passing over obstructions in the road due to its inflated condition or through other sources, I have so shaped the wire from which these coils are made, that they present a conformation in cross section preventing this turning. Specifically, these wires are shown as being formed from a square piece of wire in cross section as is indicated at 3, this wire then twisted to assume a thread-like appearance, the twists being shown at 4 and finally formed to the coil shape as shown. By this polygonal cross sectional shape, the composition forming the tire forces it way into all of the irregular shapes presented and in this manner prevents the easy removal of the whorls after a portion of the coils have been worn away.

From the foregoing description, it will be apparent that I have overcome the possibility of the easy removal of the whorls embedded in the tire by the provision of wires or wire units so shaped in cross section that, when twisted, they present a conformation preventing natural movement of the whorls about their own axes.

What I claim, is:

1. A resilient tire comprising an annular body portion, and a plurality of whorls disposed in the tread portion of said body, said whorls being formed of a wire the shape of which is such as will prevent their turning about their own axes when embedded in said tread.

2. A resilient tire comprising an annular body portion, and a plurality of whorls disposed in the tread portion of said body, said whorls being formed of a wire unit twisted axially to present a conformation preventing the whorls turning about their axes when embedded in said tread.

3. A resilient tire comprising an annular body portion, and a plurality of whorls disposed in the tread portion of said body, said whorls being formed of a wire of uniform cross-section throughout its length but twisted about its own axis to present a conformation of the whorls preventing their turning about their axes when embedded in said tread.

4. A resilient tire comprising an annular body portion, and a plurality of whorls disposed in the tread portion of said body, said whorls being formed of twisted wire of polygonal shape in cross section.

5. A resilient tire comprising an annular body portion, and a helical coil of wire embedded in the tread portion of said body, said wire being of such shape as to present a conformation to prevent turning of the whorls of said coil about their axes when embedded in said tread.

6. A resilient tire comprising an annular body portion, and a helical coil or wire embedded in the tread portion of said body, said wire being of polygonal shape in cross section and twisted to present a thread-like appearance.

In testimony whereof I affix my signature in presence of two witnesses.

THOMAS MIDGLEY, Sr.

Witnesses:
G. A. STEPHENSON,
E. D. WILKINSON.